(12) United States Patent
Weitner et al.

(10) Patent No.: US 12,196,270 B2
(45) Date of Patent: Jan. 14, 2025

(54) SWITCHING DEVICE AND AXLE ASSEMBLY

(71) Applicant: Schaeffler Technologies AG & Co. KG, Herzogenaurach (DE)

(72) Inventors: Oleg Weitner, Furth (DE); Viktor Ruder, Furth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/928,930

(22) PCT Filed: May 6, 2021

(86) PCT No.: PCT/DE2021/100410
§ 371 (c)(1),
(2) Date: Dec. 1, 2022

(87) PCT Pub. No.: WO2021/244699
PCT Pub. Date: Dec. 9, 2021

(65) Prior Publication Data
US 2023/0228300 A1  Jul. 20, 2023

(30) Foreign Application Priority Data

Jun. 2, 2020  (DE) .................. 10 2020 114 586
Oct. 20, 2020  (DE) .................. 10 2020 127 556

(51) Int. Cl.
*F16D 11/14* (2006.01)
*F16D 11/00* (2006.01)
(Continued)

(52) U.S. Cl.
CPC .............. *F16D 11/14* (2013.01); *F16D 11/04* (2013.01); *F16D 11/10* (2013.01);
(Continued)

(58) Field of Classification Search
CPC .......... F16D 11/04; F16D 11/10; F16D 11/14; F16D 2011/002; F16D 2300/08; F16D 2300/22
(Continued)

(56) References Cited

U.S. PATENT DOCUMENTS

2013/0199884 A1*  8/2013  Eder ..................... F16D 11/14
192/69
2013/0199885 A1   8/2013  Quehenberger et al.
(Continued)

FOREIGN PATENT DOCUMENTS

DE   102014217066 A1   3/2015
DE   102019203255 A1   9/2020
(Continued)

OTHER PUBLICATIONS

See Corresponding Search Report for International Application PCT/DE2021/100410.

*Primary Examiner* — Richard M Lorence
(74) *Attorney, Agent, or Firm* — Davidson Kappel LLC

(57) ABSTRACT

A switching device for a drivetrain of a motor vehicle includes a housing in which a first and a second driveshaft are rotatably mounted. The first and second driveshafts are arranged coaxially with one another so that they have a common rotation axis; The switching device further including switchable clutch device arranged between the first and the second driveshaft. The clutch device is transferrable into a disengaged open switched position, in which the first driveshaft is freely rotatable relative to the second driveshaft, and into an engaged switched position, in which the first driveshaft is connected to the second driveshaft via the clutch device for conjoint rotation. The control element is formed by a sliding sleeve, with an annular space being formed between each of the clutch elements, the corresponding drive shaft and the control element. The control element
(Continued)

is arranged displaceably relative to the clutch element over a delimited axial path of movement, such that the volume of the annular space is variable.

18 Claims, 2 Drawing Sheets

(51) Int. Cl.
  *F16D 11/04* (2006.01)
  *F16D 11/10* (2006.01)
(52) U.S. Cl.
  CPC .... *F16D 2011/002* (2013.01); *F16D 2300/08* (2013.01); *F16D 2300/22* (2013.01)
(58) Field of Classification Search
  USPC .................................................... 192/109 D
  See application file for complete search history.

(56) References Cited

U.S. PATENT DOCUMENTS

| | | |
|---|---|---|
| 2022/0196081 A1 | 6/2022 | Ruider et al. |
| 2023/0228300 A1 | 7/2023 | Weitner et al. |

FOREIGN PATENT DOCUMENTS

| | | |
|---|---|---|
| DE | 102020115862 B3 | 5/2021 |
| KR | 20220164551 A | 12/2022 |
| WO | WO2011098595 A1 | 8/2011 |
| WO | WO2019200387 A1 | 10/2019 |

* cited by examiner

SWITCHING DEVICE AND AXLE ASSEMBLY

CROSS-REFERENCE TO RELATED APPLICATIONS

This application is the U.S. National Phase of PCT Appln. No. PCT/DE2021/100410 filed May 6, 2021, which claims priority to DE 10 2020 114 586.1, filed Jun. 2, 2020, and DE 10 2020 127 556.0, filed Oct. 20, 2020, the entire disclosures of which are incorporated by reference herein.

TECHNICAL FIELD

The present disclosure relates to a switching device for a drivetrain of a motor vehicle, comprising a housing in which a first and a second driveshaft are rotatably mounted, wherein the first and second driveshafts are arranged coaxially with one another, so that they have a common rotation axis. Furthermore, a switchable clutch device is provided, which is arranged between the first and the second driveshaft, wherein a first clutch element is connected to the first driveshaft for conjoint rotation and a second clutch element is connected to the second driveshaft in an axially displaceable manner for conjoint rotation. The clutch device is transferable into a disengaged open switched position, in which the first driveshaft can rotate freely relative to the second driveshaft, and is transferable into an engaged switched position, in which the first driveshaft is connected to the second driveshaft in a rotationally fixed manner via the clutch device, wherein a control element is provided which is displaceable in the direction of the rotation axis of the driveshafts and which, depending on its displacement position, switches the clutch device into the disengaged open or into the engaged switched position.

BACKGROUND

Such switching devices are already known in the prior art. From DE 10 2014 217 066 A1, a clutch for a switchable all-wheel drive is known, in which two aligned drive shafts are connected to one another by a clutch part that enables a positive connection between the two driveshafts. The clutch has a switching element in the form of a switching fork with which a clutch part that is displaceable in the axial direction is displaced in such a way that the positive connection between the two driveshafts is established.

A coupling assembly for a drivetrain of a motor vehicle is known from WO 2011/098 595 A1, which comprises at least one clutch that is arranged on a rotating shaft in order to selectively couple the rotating shaft to a drive element of the drivetrain. The coupling assembly further comprises at least one actuating device for actuating the clutch. The actuating device is designed to selectively bring an engagement section into engagement with a threaded section rotating with the shaft in order to bring about a relative movement of the engagement section and the threaded section in the direction of the axis of the rotating shaft and thereby to actuate the clutch in the axial direction.

SUMMARY

The present disclosure is based on the object of providing a switching device for coupling and decoupling two driveshafts or two drivable shaft sections, which is improved with regard to noise generation. Advantageously, the switching device should also have improved wear properties or less wear. Furthermore, an object of the present disclosure is to provide an axle arrangement having a switching device designed according to the present disclosure, which has precisely these properties.

A switching device according to the present disclosure comprises a housing, in which a first and a second driveshaft are rotatably mounted, wherein the first and second driveshafts are arranged coaxially with one another, so that they have a common rotation axis. Furthermore, a switchable clutch device is provided, which is arranged between the first and the second driveshaft, wherein a first clutch element is connected to the first driveshaft for conjoint rotation and a second clutch element is connected to the second driveshaft in an axially displaceable manner for conjoint rotation. The clutch device is transferable into a disengaged open switched position, in which the first driveshaft can rotate freely relative to the second driveshaft, and is transferable into an engaged switched position, in which the first driveshaft is connected to the second driveshaft in a rotationally fixed manner via the clutch device, wherein a control element is provided which is displaceable in the direction of the rotation axis of the driveshafts and which, depending on its displacement position, switches the clutch device into the disengaged open or into the engaged switched position. According to the present disclosure, the control element is formed by a sliding sleeve, which encloses at least one of the two driveshafts in an axial partial area and also encloses one of the two clutch elements in a partial area in such a way that an annular space is formed between the respective clutch element of the respective driveshaft and the control element. The control element is arranged so that it can be displaced relative to the clutch element over a limited axial displacement path in such a way that the volume of the annular space can be changed and a damping medium volume present in the annular space (such as an air volume enclosed in the annular space) can be compressed in such a way that axial vibrations of the clutch element forming the annular space can be damped. In this way, the shocks that typically occur during unwanted switching operations and lead to excessive forces and noise emissions can be significantly reduced. Furthermore, the sliding sleeve can be implemented as a particularly simple and cost-effective control element which, due to its stability, enables a particularly advantageous positioning accuracy.

Further advantageous embodiments of the present disclosure are specified in the dependent claims. The features listed individually in the dependent claims can be combined with one another in a technologically meaningful manner and can define further embodiments of the present disclosure. In addition, the features indicated in the claims are specified and explained in more detail in the description, in which further preferred embodiments of the present disclosure are shown.

According to an advantageous embodiment of the present disclosure, it can be provided that at least one bearing element designed as a roller bearing is provided between the control element and the clutch element to be moved, which in particular enables a displacement movement of the control element in the direction of the rotation axis of the driveshafts. The bearing element can ensure that the control element can reliably switch the clutch device both into the disengaged open and into the engaged switched position. Depending on the configuration, the control element can be reliably prevented from rotating along with the rotational movement of the driveshaft. A plurality of bearing elements are preferably provided; for example, exactly two bearing elements which are arranged in such a way that they support the control element at opposite points.

According to a further preferred further development of the present disclosure, it can also be provided that a circular annular sealing element is arranged between the bearing element and the annular space. The sealing element is advantageously designed as an annular disk. The advantageous effect of this configuration is based on the fact that an efficient damping mechanism was created with structurally simple means without additional installation space.

According to a further particularly preferred embodiment of the present disclosure, it can be provided that the control element designed as a sliding sleeve is designed in such a way that radial play is formed between the control element and the driveshaft in order to achieve a predetermined damping behavior. Alternatively or additionally, one or more axial venting channels can be formed between the sliding sleeve and the driveshaft in such a way that a predetermined damping behavior of the control element can be set. As a result, a desired damping behavior can be set with structurally simple means.

Furthermore, the present disclosure can also be further developed in such a way that the control element designed as a sliding sleeve has one or more throttle openings in its peripheral sleeve wall, as a result of which the adjustment options for the damping behavior can be further improved.

In a likewise preferred embodiment variant of the present disclosure, it can also be provided that the control element has an annular recess on its inner lateral surface with an axial width that limits the adjustment path and is dimensioned in such a way that the control element can be moved relative to the clutch element, over the adjustment path. In addition, the annular groove can form the receiving space for arranging the spring element/roller bearing between the sliding sleeve and the clutch element, as a result of which a design that saves further installation space could be found.

A spring element advantageously interacts with the annular space volume that has a damping effect, such that the combination of compressible annular space volume and spring element creates a type of shock absorber. The spring element is designed and arranged, for example, in such a way that the first clutch element arranged on the side facing away from the control element is pressurized with a spring force in the direction of the control element and/or that the second clutch element, which is directly coupled to the control element, is subjected to a spring force in the direction of the first clutch element.

The spring element in the first embodiment can be formed, for example, by a compression spring which applies spring force to the first clutch element against the first driveshaft in the direction of the second clutch element or control element, in which case the first clutch element would then also have to be arranged displaceably on the first driveshaft. According to the second embodiment described, a spring element can be arranged within the annular space, which spring force acts on the second clutch element against the compression direction (in particular supported on the second driveshaft) in the direction of the first clutch element. As a result, further improved vibration damping can be achieved in the smallest of spaces.

It can also be advantageous to further develop the present disclosure such that a gear element is provided on an outer circumference of the sliding sleeve, wherein the gear element is preferably formed by an external toothing or an external thread. An easily accessible gear element can be realized through the external toothing. The external toothing is preferably configured to be in engagement with a pinion shaft. The external toothing is preferably designed like the external toothing in the manner of a toothed rack. A rotation of the pinion shaft then causes the external teeth to be advanced so that the control element is also moved in the direction of the rotation axis.

It is further proposed that the clutch device is formed by a dog clutch, wherein each driveshaft is connected to a dog clutch element for conjoint rotation. By switching at least one of the dog clutch elements in the direction of the rotation axis, the dog clutch makes it possible to establish a connection via a form fit for conjoint rotation.

In addition, the object on which the present disclosure is based is achieved by an axle arrangement for a motor vehicle having a differential gear, wherein a switching device according to any one of the preceding claims is arranged between the differential gear and a vehicle wheel and by means of which the vehicle wheel can be switched between a driven and a non-driven operating state.

Both the present disclosure and the technical field are explained in more detail below with reference to the figures. It should be noted that the present disclosure is not intended to be limited by the exemplary embodiments shown. In particular, unless explicitly stated otherwise, it is also possible to extract partial aspects of the substantive matter outlined in the figures and to combine them with other components and knowledge from the present description and/or figures. In particular, it should be noted that the figures and in particular the proportions shown are only schematic. Identical reference symbols indicate the same objects, so explanations from other figures can also be used.

DETAILED DESCRIPTION

Figure 1:
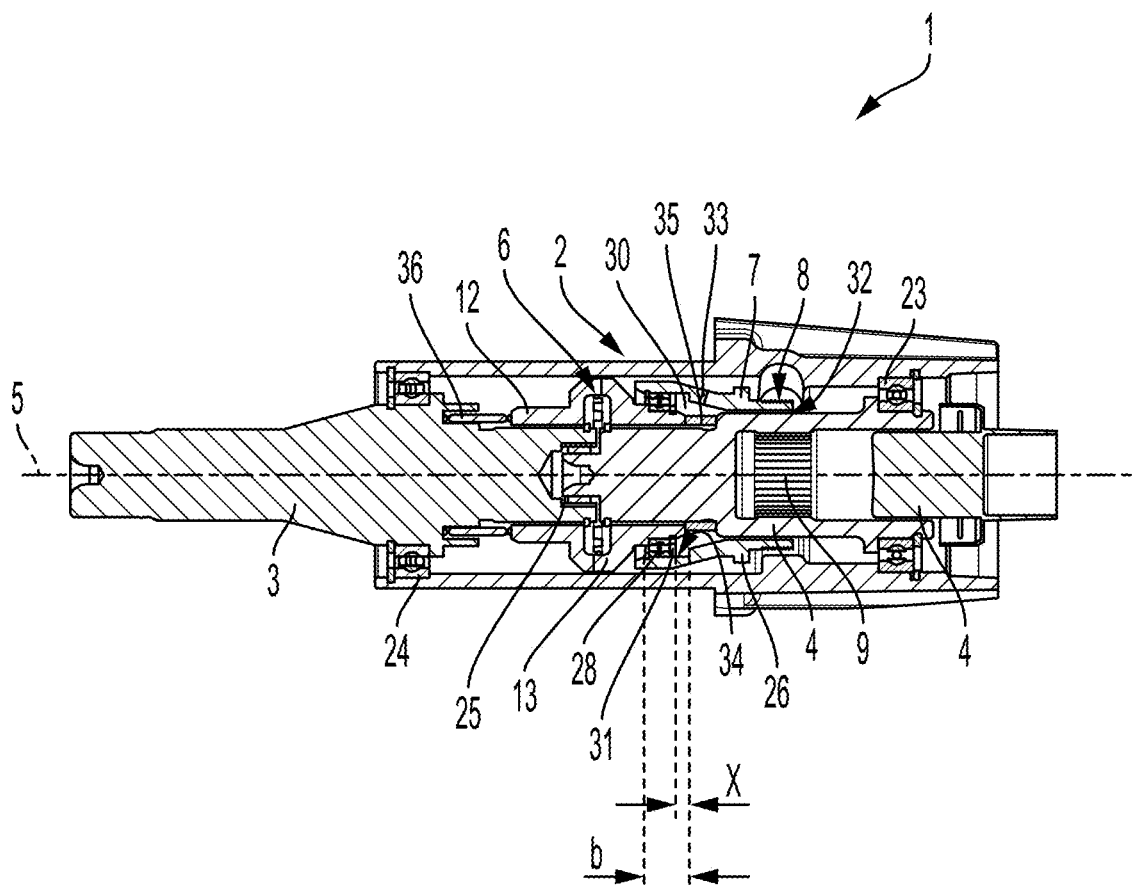
FIG. 1 shows a schematic representation of an axial section of a switching device in a possible embodiment of the present disclosure.

FIG. 1 shows a switching device 1 having a first driveshaft 3 and a second driveshaft 4 which can be connected to one another via a clutch device 6 for conjoint rotation. The second driveshaft 4, which protrudes from the housing on the right-hand side, comprises two sub-shafts which can be plugged into one another in some areas and which are connected to one another via a toothing 9 for conjoint rotation. The second driveshaft 4 is mounted at one axial end with a section with a reduced diameter in a holder 25 of the first driveshaft 3 via a radial needle bearing. At its other axial end, the second driveshaft 4 is mounted in relation to a housing 2 via a ball bearing 23. The first driveshaft 3 is supported within the housing 2 by a ball bearing 24 and by an extension of the second driveshaft 4 which projects into the holder 25 of the first driveshaft 3. The first and second driveshafts 3 and 4 are aligned coaxially with one another and therefore rotate about a common rotation axis 5.

One end of each of the first and second driveshafts 3 and 4 protrudes from the housing 2. In the assembled state, the first driveshaft 3 can then be connected to a differential gear for conjoint rotation, for example, and the second driveshaft 4 to a drive wheel, for example, or vice versa.

At the ends of the first and second driveshafts 3, 4 facing one another, the clutch device 6 is provided, which comprises a first (dog) clutch element 12 assigned to the first driveshaft 3 and a second (dog) clutch element 13 assigned to the second driveshaft 4. The clutch device 6 can be switched into a disengaged open switched position in which the first driveshaft 3 and the second driveshaft 4 are not connected to one another for conjoint rotation. Furthermore, the clutch device 6 can be switched into an engaged switched position in which the first driveshaft 3 is connected to the second driveshaft 4 for conjoint rotation. The clutch device 6 is controlled by means of a control element 7 which is mounted on the second driveshaft 4 in an axially displaceable manner, i.e., in the direction of the rotation axis 5. In this embodiment, the control element 7 is designed as a sliding sleeve, wherein the sleeve shape extends from a transmission element 8 with a section that widens the diameter to the point at which the control forces are introduced into the clutch device 6.

The gear element 8 has a toothing in the manner of a toothed rack, such that the gear element 8 can be displaced together with the control element 7 in the direction of the rotation axis 5. The transmission element 8 can be driven, for example, via a pinion shaft, which is not shown in FIG. 1, such that a feed of the control element 7 along the rotation axis 5 results from a rotational movement of the pinion shaft.

The movement of the control element 7 is transmitted to the second dog clutch element 13 via a roller bearing 28. The roller bearing 28 ensures that at most a minimal torque is transmitted to the control element 7 as a result of any rotational movement of the second dog clutch element 13. The clutch device 6 can thus be switched into an engaged or disengaged open switched position by means of the control device 7. By moving the control element 7 in the direction of the rotation axis 5 towards the first dog clutch element 12, the second dog clutch element 13 can be connected in a form-fitting manner to the first dog clutch element 12 in an engaged switched position. By moving the control element 7 in the opposite direction, the clutch device 6 can be switched into a disengaged open switched position in which the dog clutch elements 12 and 13 are not engaged with one another. The control element 7 also has an extension 26 which extends outwards in the radial direction and which comes into contact with the housing 2 in the disengaged open switched position, so that an end position of the control element 7 is fixed.

FIG. 1 also shows that the control element 7 is formed by a sliding sleeve which encloses at least one of the two driveshafts 3, 4 circumferentially in an axial partial area and also encloses one of the two clutch elements 12, 13 in a partial area circumferentially, such that an annular space 30 is formed between the respective clutch element 12, 13, the respective driveshaft 3, 4 and the control element 7, wherein the control element 7 is arranged such that it can be displaced relative to the clutch element 12, 13 over a limited axial displacement path x, such that the annular space 30 is variable in its volume and an existing damping medium volume in the annular space 30 can be compressed. In this way, for example, an air volume enclosed in the annular space can be compressed and any vibrations of the second clutch element 13, which also forms the annular space 30, can be damped. A spring element 35 or a spring element 36 interacts with the annular space volume, which has a damping effect, so that the combination of compressible annular space volume and spring element 35, 36 creates a type of shock absorber. The spring element 36 in the illustrated embodiment is formed by a compression spring which applies spring force to the first clutch element 12 against the first driveshaft 3 in the direction of the second clutch element 13 or control element 7. For this purpose, the first clutch element 12 is then also slidably arranged on the first driveshaft 3. Furthermore, the further spring element 35 is formed in the illustrated embodiment by a compression spring which is supported on a radially widened projection of the second rotor shaft 4 against the second clutch element 13 in the direction of the first clutch element 12.

It can also be seen from FIG. 1 that at least one bearing element 28 designed as a roller bearing is provided between the control element 7 and the clutch element 12, 13 to be moved. A circular annular sealing element 31 designed as an annular disk for sealing the annular space is arranged between the bearing element 10 and the annular space 30.

The control element 7 designed as a sliding sleeve is designed in such a way that there is a predetermined radial play 32 between the control element 7 and the driveshaft 3, 4, or such that one or more axial ventilation channels are formed between the sliding sleeve and the driveshaft 4, so that a predetermined damping behavior of the control element 7 can be set.

FIG. 1 also shows that the control element 7 designed as a sliding sleeve has one or more throttle openings 33 in its peripheral sleeve wall, which are also provided for being able to set a predetermined damping behavior of the control element 7. The control element 7 has an annular recess 34 on its inner lateral surface with an axial width b that limits the adjustment path x. The recess 34 is dimensioned in such a way that the control element 7 can be displaced relative to the clutch element 12, 13 over the adjustment path x.

FIG. 1 also shows that a gear element 8 is provided on an outer circumference of the sliding sleeve, wherein the gear element 8 is formed by an external toothing.

Figure 2:
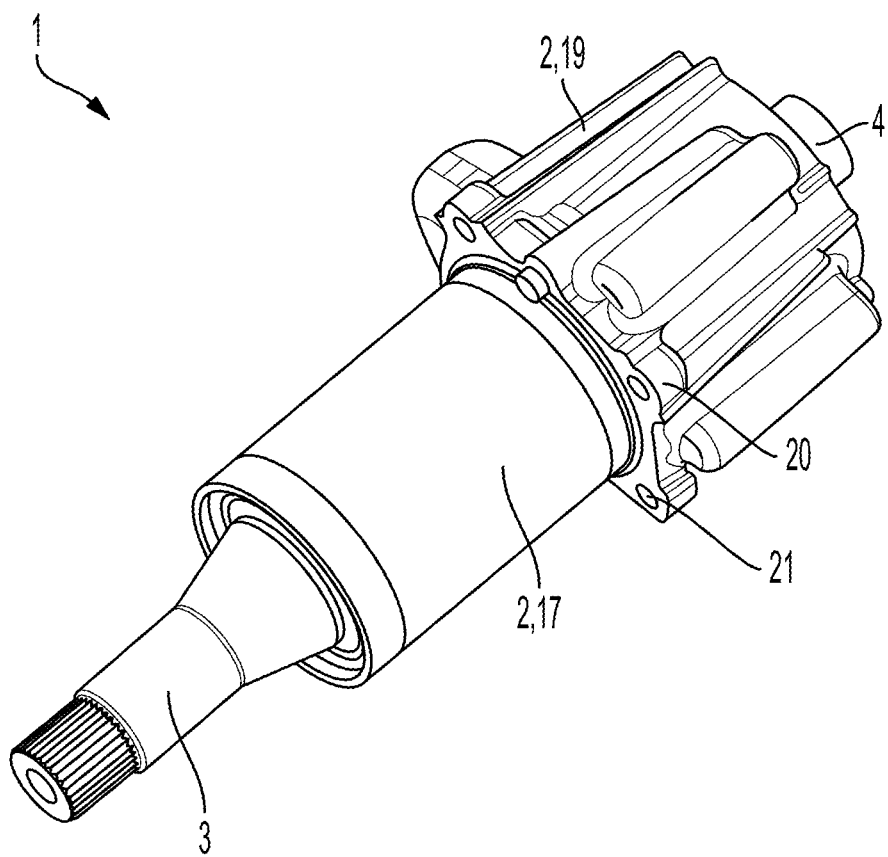
FIG. 2 shows a perspective view of the switching device according to FIG. 1.

FIG. 2 shows a representation of the switching device 1 according to FIG. 1 in a perspective view, wherein a division of the housing 2 can be seen. The housing 2 has a mounting flange 20 with fastening means 21, via which the switching device 1 can be fastened to a transmission housing. A plurality of fastening means 21 is preferably provided so that a stable and reliable connection to the transmission housing is possible. The fastening means 21 are preferably formed by bores in the mounting flange 20, so that simple fastening is made possible, for example using bolts or screws.

The housing 2 is divided into a first housing part 17 and a second housing part 19. The first housing part 17 has a cylindrical outer contour, so that the first housing part 17 can be inserted into a likewise cylindrical holder of a transmission housing and can be stored there. In the mounted state, the first housing part 17 protrudes so far into the transmission housing that the mounting flange 20 comes to rest on the transmission housing. The second housing part 19 then comprises the part of the housing 2 with the mounting flange 20, which protrudes from the transmission housing.

The present disclosure is not limited to the embodiments shown in the figures. The above description is therefore not to be regarded as restrictive, but rather as explanatory. The following claims are to be understood as meaning that a named feature is present in at least one embodiment of the present disclosure. This does not exclude the presence of further features. If the patent claims and the above description define "first" and "second" features, this designation serves to distinguish between two features of the same type without defining an order of precedence.

LIST OF REFERENCE SYMBOLS

1 Switching device
2 Housing
3 Driveshaft

4 Driveshaft
5 Rotation axis
6 Clutch device
7 Control element
8 Gear element
9 Toothing (driveshaft)
12 First clutch element
13 Second clutch element
17 First housing part
19 Second housing part
20 Mounting flange
21 Fastening means
23 Ball bearing
24 Ball bearing
25 Holder (driveshaft)
26 Radial extension (control element)
28 Bearing element
30 Annular space
31 Sealing element
32 Play
33 Throttle openings
34 Recess
35 Spring element
36 Spring element (annular space)
x Adjustment path
b Width (recess)

What is claimed is:

1. A switching device for a drivetrain of a motor vehicle, comprising:
   a housing, in which a first and a second driveshaft are rotatably mounted, the first and second driveshafts being arranged coaxially with respect to one another on a common rotation axis; and
   a switchable clutch device arranged between the first and the second driveshafts, the clutch device including a first clutch element connected to the first driveshaft for conjoint rotation and a second clutch element connected to the second driveshaft in an axially displaceable manner for conjoint rotation; and
   the clutch device being transferable into a disengaged open switched position in which the first driveshaft is freely rotatably relative to the second driveshaft, and
   the clutch device is transferable into an engaged switched position, in which the first driveshaft is connected to the second driveshaft via the clutch device for conjoint rotation,
   the clutch device including a control element displaceable in a direction of the rotation axis of the first and second driveshafts and which, depending on a displacement position of the control element, switches the clutch device into the disengaged open or engaged switched position,
   the control element being formed by a sliding sleeve which encloses at least one of the first and second driveshafts circumferentially in an axial partial area and encloses one of the first and second clutch elements in a partial area circumferentially, such that an annular space is formed between the second clutch element, the second driveshaft and the control element, the control element being arranged such that the control element is displaceable relative to the first or second clutch element over a limited axial adjustment path, such that a volume of the annular space is variable and an existing damping medium volume in the annular space is compressible in such a way that axial vibrations of the first or second clutch element forming the annular space are dampable.

2. The switching device according to claim 1, further comprising a roller bearing between the control element and the second clutch element.

3. The switching device according to claim 2, further comprising an annular sealing element arranged between the roller bearing and the annular space.

4. The switching device according to claim 3, wherein the sealing element is an annular disk.

5. The switching device according to claim 1, wherein the sliding sleeve is configured such that there is a radial play between the control element and the first or second driveshaft or one or more axial ventilation channels are configured such that a predetermined damping behavior of the control element is settable.

6. The switching device according to claim 1, wherein the sliding sleeve has one or more throttle openings in a peripheral sleeve wall of the sliding sleeve, such that a predetermined damping behavior of the control element is settable.

7. The switching device according to claim 1, wherein the control element has an annular recess on an inner lateral surface of the control element with an axial width that limits the adjustment path and is dimensioned in such that the control element is displaceable relative to the clutch element over the adjustment path.

8. The switching device according to claim 7, further comprising a spring element acting on the second clutch element in a direction of the first clutch element with a spring force, and/or a spring element acting on the first clutch element with a spring force in a direction of the second clutch element.

9. The switching device according to claim 1, further comprising a gear element on an outer circumference of the sliding sleeve.

10. The switching device according to claim 1, wherein the clutch device is formed by a dog clutch, wherein the first and second clutch elements are dog clutch elements.

11. An axle arrangement for a motor vehicle having a differential gear, the axle arrangement comprising:
    the switching device according to claim 1 arranged between the differential gear and a vehicle wheel, by which the vehicle wheel is switchable between a driven and a non-driven operating state.

12. A switching device for a drivetrain of a motor vehicle, comprising:
    a housing;
    a first driveshaft and a second driveshaft rotatably mounted in the housing; and
    a dog clutch arranged in the housing, the dog clutch including a first dog clutch element connected to the first driveshaft and a second dog clutch element connected to the second driveshaft, and
    the dog clutch being transferable into a disengaged open switched position in which the first driveshaft is freely rotatably relative to the second driveshaft, and
    the dog clutch is transferable into an engaged switched position, in which the first driveshaft is connected to the second driveshaft via the dog clutch for conjoint rotation,
    the dog clutch including a displaceable sliding sleeve which, depending on a displacement position of the sliding sleeve, switches the dog clutch into the disengaged open or engaged switched position,
    an annular space being formed between the second dog clutch element, the second driveshaft and the sliding sleeve, the sliding sleeve being arranged such that the sliding sleeve is displaceable relative to the first or second dog clutch element over a limited axial adjustment path such that a volume of the annular space is variable, the sliding sleeve including a plurality of throttle openings.

13. The switching device according to claim 12, further comprising a bearing element radially between a portion of the sliding sleeve and a portion of the second dog clutch element.

14. The switching device according to claim 13, further comprising an annular sealing element arranged between the bearing element and the annular space for sealing the annular space.

15. The switching device according to claim 12, wherein the sliding sleeve includes an outwardly extending radial extension configured for contacting the housing in the disengaged open switched position.

16. The switching device according to claim 12, wherein the second driveshaft includes first sub-shaft and a second sub-shaft connected together via toothing, the first sub-shaft protruding from the housing, an end of the second sub-shaft protruding into a holder in the first driveshaft.

17. The switching device according to claim 12, wherein the sliding sleeve includes a gear element including a toothing in a manner of a toothed rack configured for being driven along a rotation axis of the second driveshaft via a rotational movement of an input engaging the toothing.

18. A method of constructing a shifting device for a drivetrain of a motor vehicle, comprising:

providing a housing including a first housing part and a second housing part; and installing first driveshaft, a second driveshaft and a shiftable clutch device inside of the housing, the first driveshaft being rotatably mounted in the first housing part by a first bearing, the second driveshaft being rotatably mounted in the second housing part by a second bearing, the shiftable clutch device including a first clutch element connected to the first driveshaft for conjoint rotation and a second clutch element connected to the second driveshaft in an axially displaceable manner for conjoint rotation; and the clutch device being transferable into a disengaged open switched position in which the first driveshaft is freely rotatably relative to the second driveshaft, and the clutch device is transferable into an engaged switched position, in which the first driveshaft is connected to the second driveshaft via the clutch device for conjoint rotation, the clutch device including a sliding sleeve axially displaceable to shift the clutch device between the disengaged open switched position and the engaged switched position, the sliding sleeve surrounding at least one of the first and second driveshafts such that an annular space is formed between the second clutch element, the second driveshaft and the sliding sleeve, an outer circumference of the sliding sleeve including a gear element, the sliding sleeve being arranged such that the sliding sleeve is displaceable relative to the second clutch element over a limited axial adjustment path, such that a volume of the annular space is variable and an existing damping medium volume in the annular space is compressible in such a way that axial vibrations of the second clutch element forming the annular space are dampable.

* * * * *